US012294269B2

(12) United States Patent
Takayama

(10) Patent No.: US 12,294,269 B2
(45) Date of Patent: May 6, 2025

(54) MOTOR, COMPRESSOR, AND FAN MOTOR

(71) Applicant: DAIKIN INDUSTRIES, LTD., Osaka (JP)

(72) Inventor: Yoshinori Takayama, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 253 days.

(21) Appl. No.: 17/974,293

(22) Filed: Oct. 26, 2022

(65) Prior Publication Data

US 2023/0047683 A1   Feb. 16, 2023

Related U.S. Application Data

(63) Continuation of application No. PCT/JP2021/014615, filed on Apr. 6, 2021.

(30) Foreign Application Priority Data

Apr. 30, 2020   (JP) ................. 2020-080622

(51) Int. Cl.
*H02K 3/52* (2006.01)
*F04D 25/06* (2006.01)
*F25B 31/02* (2006.01)

(52) U.S. Cl.
CPC ............ *H02K 3/522* (2013.01); *F04D 25/06* (2013.01); *F25B 31/026* (2013.01); *H02K 2203/12* (2013.01)

(58) Field of Classification Search
CPC .......... H02K 5/22; H02K 5/225; H02K 5/521; H02K 5/522; H02K 2203/12; H01R 4/18;
(Continued)

(56) References Cited

U.S. PATENT DOCUMENTS

2001/0002776 A1\* 6/2001 Suzuki ............... H02K 21/48
310/194
2011/0316365 A1   12/2011 Kim
(Continued)

FOREIGN PATENT DOCUMENTS

JP    62-165764 U    10/1987
JP    7-111749 A     4/1995
(Continued)

OTHER PUBLICATIONS

European Search Report of corresponding EP Application No. 21 79 5289.4 dated Jul. 28, 2023.
(Continued)

*Primary Examiner* — Tran N Nguyen
(74) *Attorney, Agent, or Firm* — GLOBAL IP COUNSELORS, LLP

(57) ABSTRACT

A motor includes a stator core having an annular shape, a coil wound around a tooth of the stator core, a first terminal electrically connected to the coil, a housing that houses the first terminal, and a second terminal at least partially inserted into the first terminal housed in the housing. The second terminal includes an electrical connecting portion inserted into the first terminal and electrically connected to the first terminal. The housing includes a first restricting portion that restricts movement, in a circumferential direction of the stator core, of a portion of the second terminal other than the electrical connecting portion.

7 Claims, 7 Drawing Sheets

(58) Field of Classification Search
CPC ...... H01R 4/241; H01R 4/242; H01R 4/2425;
H01R 4/2429; H01R 4/2433; H01R
13/04; H01R 13/46; H01R 13/50; H01R
13/115; H01R 13/506; H01R 13/514;
H01R 13/516; H01R 13/518; H01R
13/533; H01R 13/6273
USPC .......................................................... 310/194
See application file for complete search history.

(56) References Cited

U.S. PATENT DOCUMENTS

| | | | |
|---|---|---|---|
| 2015/0123501 | A1 | 5/2015 | Jang et al. |
| 2018/0083516 | A1 | 3/2018 | Endo et al. |
| 2018/0367008 | A1 | 12/2018 | Hwang et al. |

FOREIGN PATENT DOCUMENTS

| | | | |
|---|---|---|---|
| JP | 2001-275291 | A | 10/2001 |
| JP | 2015-516797 | A | 6/2015 |
| JP | 2019-161894 | A | 9/2019 |
| KR | 10-0883601 | B1 | 2/2009 |
| KR | 10-1389612 | B1 | 4/2014 |

OTHER PUBLICATIONS

International Search Report of corresponding PCT Application No. PCT/JP2021/014615 dated May 25, 2021.
International Preliminary Report of corresponding PCT Application No. PCT/JP2021/014615 dated Nov. 10, 2022.

* cited by examiner

MOTOR, COMPRESSOR, AND FAN MOTOR

CROSS-REFERENCE TO RELATED APPLICATIONS

This is a continuation of International Application No. PCT/JP2021/014615 filed on Apr. 6, 2021, which claims priority to Japanese Patent Application No. 2020-080622, filed on Apr. 30, 2020. The entire disclosures of these applications are incorporated by reference herein.

BACKGROUND

Technical Field

The present disclosure relates to a motor, a compressor, and a fan motor.

Background Art

A motor in the related art includes a motor housing manufactured by inserting a stator into a mold and injecting BMC resin into the mold (see Japanese Laid-Open Patent Publication No. 2015-516797). The stator includes a stator core and an upper insulator attached to the stator core. A mag mate portion is formed in the upper insulator, and a mag mate terminal is fitted into the mag mate portion to establish electrical connection between the mag mate portion and the mag mate terminal.

SUMMARY

The motor in the related art may cause an increase in contact resistance, for example, due to a reduction in contact area between the mag mate portion and the mag mate terminal when the mag mate terminal is unintentionally deformed or moved due to pressure produced by resin during injection molding.

The present disclosure proposes a motor, a compressor, and a fan motor capable of suppressing an increase in contact resistance between terminals.

A motor according to one aspect of the present disclosure includes a stator core having an annular shape, a coil wound around a tooth of the stator core, a first terminal electrically connected to the coil, a housing that houses the first terminal, and a second terminal at least partially inserted into the first terminal housed in the housing, in which the second terminal includes an electrical connecting portion inserted into the first terminal and electrically connected to the first terminal, and the housing includes a first restricting portion that restricts movement, in a circumferential direction of the stator core, of a portion of the second terminal other than the electrical connecting portion.

DETAILED DESCRIPTION OF EMBODIMENT(S)

Hereinafter, a motor, a compressor, and a fan motor according to embodiments of the present disclosure will be described with reference to the accompanying drawings.

First Embodiment

Figure 1:
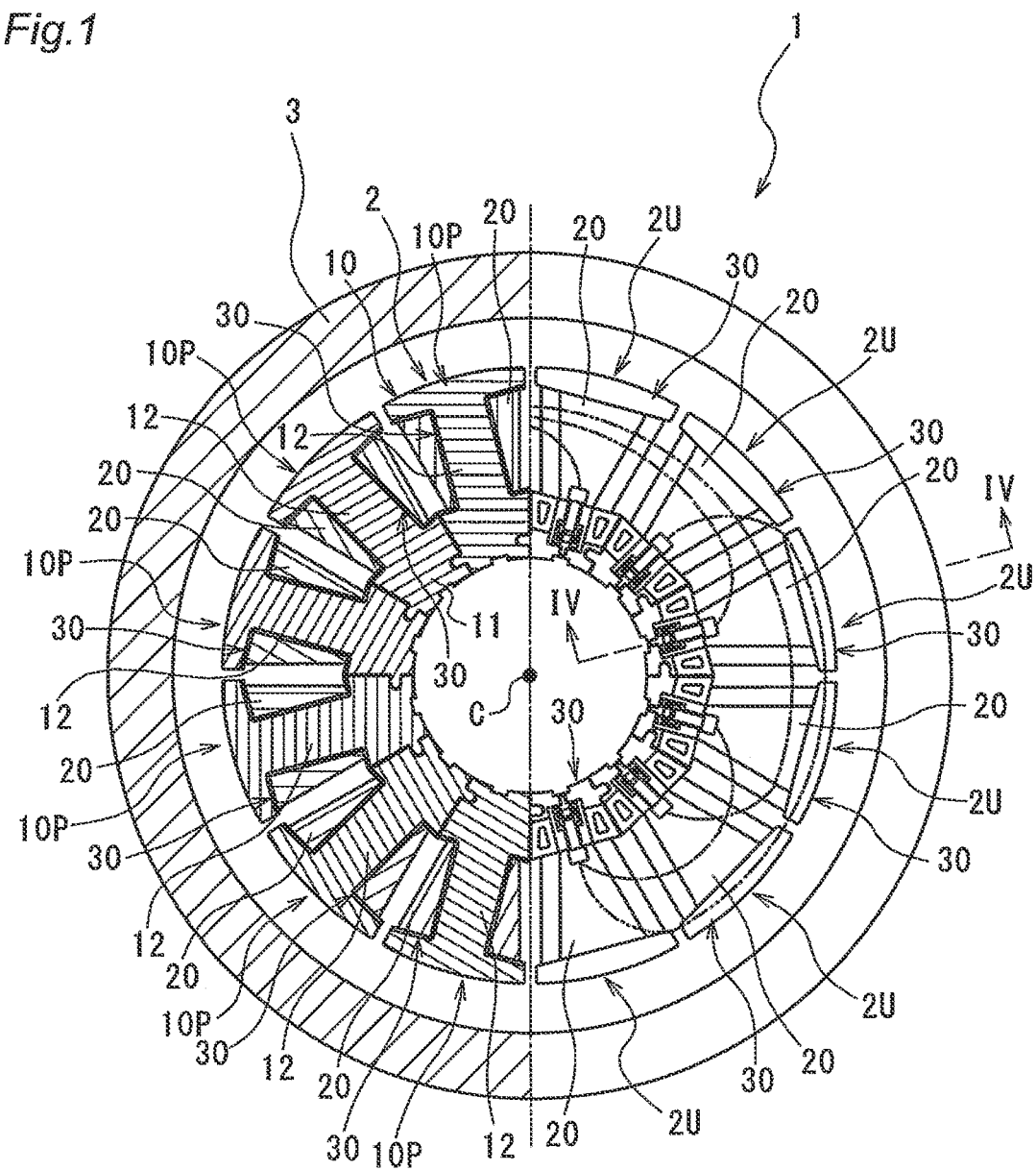
FIG. 1 is a schematic cross-sectional view of a motor according to a first embodiment of the present disclosure, taken along a plane orthogonal to an axial direction of the motor.

FIG. 1 is a partial cross-sectional view of a motor 1 according to a first embodiment. In FIG. 1, a right half portion is an external view of the motor 1 as viewed in a center axial direction, and a left half portion is a cross-sectional view of the motor 1 taken along a plane orthogonal to the center axial direction.

With reference to FIG. 1, the motor 1 according to the present embodiment is a so-called three-phase AC motor of an outer rotor type. The motor 1 according to the present embodiment includes a stator 2 having an annular shape and a rotor 3 having an annular shape and disposed to surround the stator 2.

In the following description, an "axial direction" may indicate a center axis direction of the motor 1, a "radial direction" may indicate a radial direction centered on a center axis C of the motor 1, and a "circumferential direction" may indicate a circumferential direction centered on the center axis C of the motor 1. Further, according to the present embodiment, a center axis of the stator 2, and a center axis of the rotor 3 coincide with the center axis C of the motor 1. That is, the terms "axial direction", "radial direction", and "circumferential direction" respectively indicate the "axial direction", "radial direction", and "circumferential direction" of the stator 2 or the rotor 3.

The stator 2 includes a stator core 10 having an annular shape, a plurality of (12 in the present embodiment) coils 20 wound around the stator core 10, and a plurality of (12 in the present embodiment) insulators 30 each provided between the stator core 10 and a corresponding one of the coils 20. Although not shown in the drawings, the stator 2 is resin-molded so as to be covered with bulk molding compound (BMC) resin that is a thermosetting resin material.

The stator core 10 is formed of laminated steel plates made of a conductive soft magnetic material. The stator core 10 includes a back yoke 11 having an annular shape and a plurality of (12 in the present embodiment) teeth 12 extending outward in the radial direction from an outer peripheral surface of the back yoke 11.

A plurality of (12 in the present embodiment) stator core pieces 10P are coupled to each other in the circumferential direction to form the stator core 10. The stator core pieces 10P are each provided with one tooth 12.

Each coil 20 is a copper wire coated with an insulating material such as enamel resin, and is wound around a corresponding tooth 12 of the stator core 10 with an axis extending in the radial direction as a winding axis.

Each insulator 30 is formed of an insulating resin material, and insulates the stator core 10 from a corresponding coil 20 so as to prevent a current flowing through the coil 20 from being transmitted to the stator core 10.

A plurality of (12 in the present embodiment) stator units 2U are coupled to each other in the circumferential direction to form the stator 2 according to the present embodiment. Each of the stator units 2U includes one stator core piece 10P, one coil 20, and one insulator 30.

The rotor 3 has a cylindrical shape and is disposed outside the stator 2 in the radial direction in a rotatable manner. The rotor 3 is multipole-magnetized such that N poles and S poles are alternately arranged in the circumferential direction.

Figure 2:
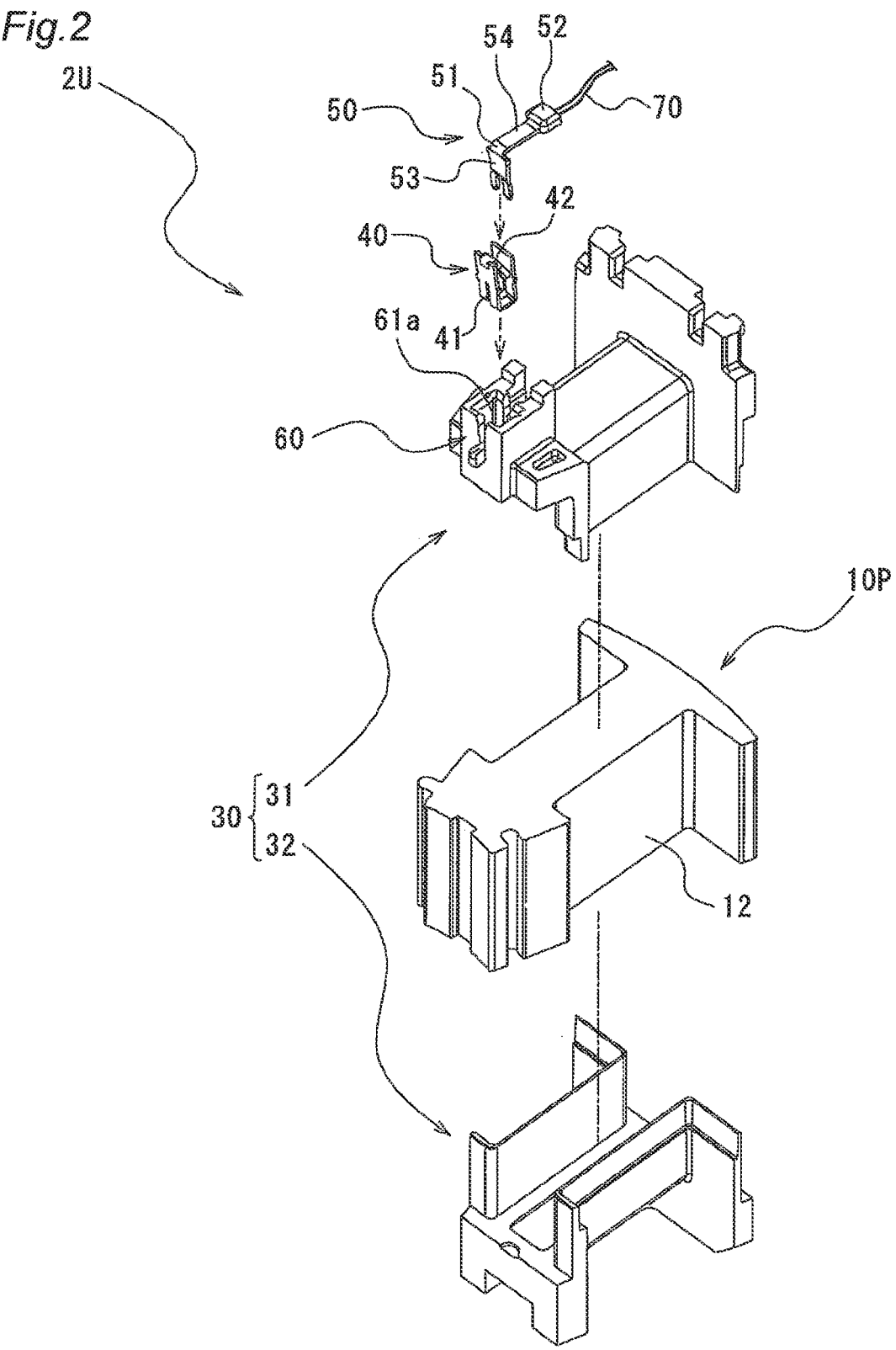
FIG. 2 is an exploded perspective view of a stator unit according to the first embodiment.

FIG. 2 is an exploded perspective view of each stator unit 2U according to the present embodiment. In FIG. 2, the coil 20 (shown in FIG. 1) is not shown.

With reference to FIG. 2, the stator unit 2U includes, as described above, the stator core piece 10P, the insulator 30 that covers a part of the stator core piece 10P, and the coil 20 (shown in FIG. 1) wound around the tooth 12 of the stator core piece 10P. The stator unit 2U further includes a first terminal 40 electrically connected to the coil 20 (shown in FIG. 1) and a second terminal 50 inserted and fitted into the first terminal 40.

The insulator 30 includes a first insulator 31 attached to one side (upper side in FIG. 2) of the stator core piece 10P in the axial direction and a second insulator 32 attached to the other side (lower side in FIG. 2) of the stator core piece 10P in the axial direction. The first insulator 31 and the second insulator 32 are attached to the stator core piece 10P so as to cover the tooth 12 of the stator core piece 10P.

The first insulator 31 includes a housing 60 for housing the first terminal 40. The housing 60 according to the present embodiment has a bottomed box shape and is provided integrally with the first insulator 31. The housing 60 is provided at an inner end of the first insulator 31 in the radial direction.

The first terminal 40 is a female terminal made of a conductive metal. The first terminal 40 is housed in the housing 60 provided in the first insulator 31. Further, the first terminal 40 includes a connection groove 41 for establishing connection with a lead wire (not shown) drawn from the coil 20 (shown in FIG. 1), and a receiving portion 42 for fitting with the second terminal 50. Fitting the lead wire of the coil 20 into the connection groove 41 with the first terminal 40 housed in the housing 60 establishes electrical connection between the first terminal 40 and the coil 20. Further, fitting the second terminal 50 into the receiving portion 42 establishes electrical connection between the first terminal 40 and the second terminal 50.

The second terminal 50 is made of a conductive metal and is a male terminal adapted to the first terminal 40 that is a female terminal. The second terminal 50 has an L shape bent at a bent portion 51. The second terminal 50 includes a wire connecting portion 52 connected to a wire 70 and an electrical connecting portion 53 electrically connected to the first terminal 40. The wire connecting portion 52 is provided on an opposite side of the bent portion 51 from the electrical connecting portion 53. In other words, the wire connecting portion 52 is provided adjacent to a side of the bent portion 51 remote from the electrical connecting portion 53. The second terminal 50 further includes a plate-shaped flat plate portion 54 extending from the bent portion 51 to the wire connecting portion 52.

The second terminal 50 is inserted into and coupled to the first terminal 40. Specifically, the electrical connecting portion 53 is inserted and fitted into the receiving portion 42 of the first terminal 40 to couple the second terminal 50 to the first terminal 40. This establishes electrical connection between the first terminal 40 and the second terminal 50.

Figure 3:
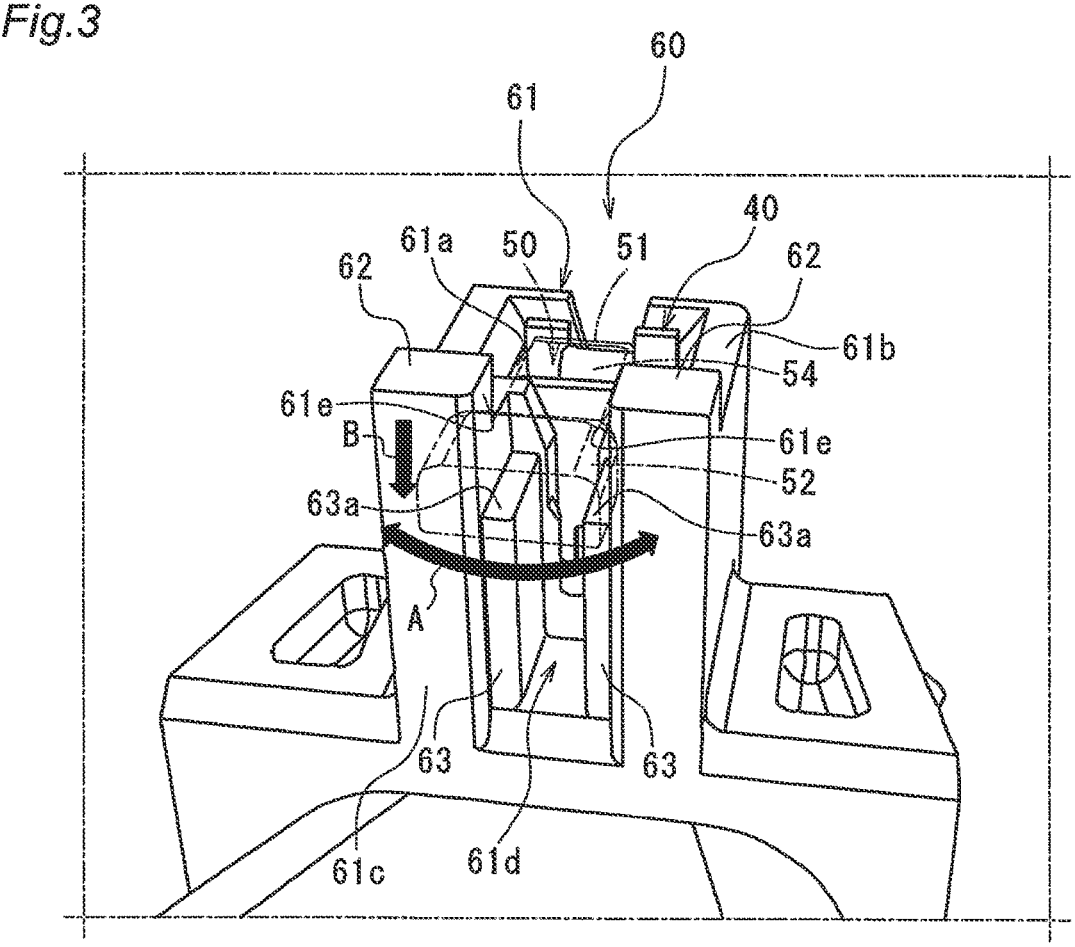
FIG. 3 is a perspective view of a portion near a housing according to the first embodiment.

FIG. 3 is a perspective view of a portion near the housing 60 according to the present embodiment. In FIG. 3, the second terminal 50 is indicated by a long dashed double-short dashed line.

With reference to FIG. 3, the housing 60 according to the present embodiment includes a housing body 61, a pair of first restricting portions 62 protruding from the housing body 61 toward one side in the axial direction (upper side in FIG. 3), and a pair of second restricting portions 63 provided in the housing body 61.

The housing body 61 has an approximately rectangular parallelepiped shape. The housing body 61 is provided with a holding hole 61a for housing and holding the first terminal 40. An opening is formed in an upper surface 61b of the housing body 61 by the holding hole 61a.

A slit 61d is provided in a side surface 61c located on an outer side of the housing body 61 in the radial direction. The slit 61d is provided to communicate with the holding hole 61a.

The pair of first restricting portions 62 according to the present embodiment are protrusions protruding from the upper surface 61b of the housing body 61 toward one side in the axial direction (upper side in FIG. 3). The pair of first restricting portions 62 are arranged outside of the holding hole 61a in the radial direction. The pair of first restricting portions 62 are arranged spaced apart from each other in the circumferential direction. More specifically, the pair of first restricting portions 62 are provided on both sides, in the circumferential direction, of the slit 61d provided in the housing body 61. The pair of first restricting portions 62 are provided integrally with the housing body 61.

The pair of first restricting portions 62 according to the present embodiment restrict movement of the second terminal 50 in the circumferential direction. Specifically, the first restricting portions 62 restrict movement, in the circumferential direction (see an arrow A in FIG. 3), of a portion (for example, the flat plate portion 54) of the second terminal 50 other than a portion inserted and fitted into the first terminal 40 (specifically, the electrical connecting portion 53).

In the present embodiment, the electrical connecting portion 53 of the second terminal 50 is fitted and fixed to the first terminal 40. Therefore, when a force in the circumferential direction acts on the wire connecting portion 52 of the second terminal 50, a portion of the second terminal 50 on a side of the wire connecting portion 52 relative to the bent portion 51 tries to move in the circumferential direction with the bent portion 51 as a base point. When the portion of the second terminal 50 on the side of the wire connecting portion 52 tries to move in the circumferential direction with the bent portion 51 as a base point, the first restricting portions 62 come into contact with the flat plate portion 54 of the second terminal 50 to restrict the movement. This causes the first restricting portions 62 to prevent the second terminal 50 from being deformed when the force in the circumferential direction acts on the wire connecting portion 52 of the second terminal 50.

The pair of second restricting portions 63 according to the present embodiment have a table shape provided in the housing body 61. The second restricting portions 63 are provided so as to protrude from a pair of inner surfaces 61e of the housing body 61 defining the slit 61d. That is, the second restricting portions 63 are provided so as to protrude toward the slit 61d. The pair of second restricting portions 63 are arranged spaced apart from each other in the circumferential direction so as to face each other. Each of the pair of second restricting portions 63 has a restricting surface 63a.

The second restricting portions 63 restricts movement (see an arrow B in FIG. 3) of the second terminal 50 toward one side in the axial direction (lower side in FIG. 3). Specifically, the second restricting portions 63 restrict movement, toward one side in the axial direction, of a portion (for example, the flat plate portion 54) of the second terminal 50 other than a portion inserted and fitted into the first terminal 40 (specifically, the electrical connecting portion 53).

In the present embodiment, the electrical connecting portion 53 of the second terminal 50 is, as described above, fitted and fixed to the first terminal 40. Therefore, when a force toward one side in the axial direction (downward in FIG. 3) acts on the wire connecting portion 52 of the second terminal 50, the portion of the second terminal 50 on the side of the wire connecting portion 52 relative to the bent portion 51 tries to move downward with the bent portion 51 as a base point. When the portion of the second terminal 50 on the side of the wire connecting portion 52 tries to move downward with the bent portion 51 as a base point, the restricting surfaces 63a of the second restricting portions 63 come into contact with the flat plate portion 54 of the second terminal 50 to restrict the movement. This causes the second restricting portions 63 to prevent the second terminal 50 from being deformed when the force toward one side in the axial direction (downward in FIG. 3) acts on the wire connecting portion 52 of the second terminal 50.

Figure 4:
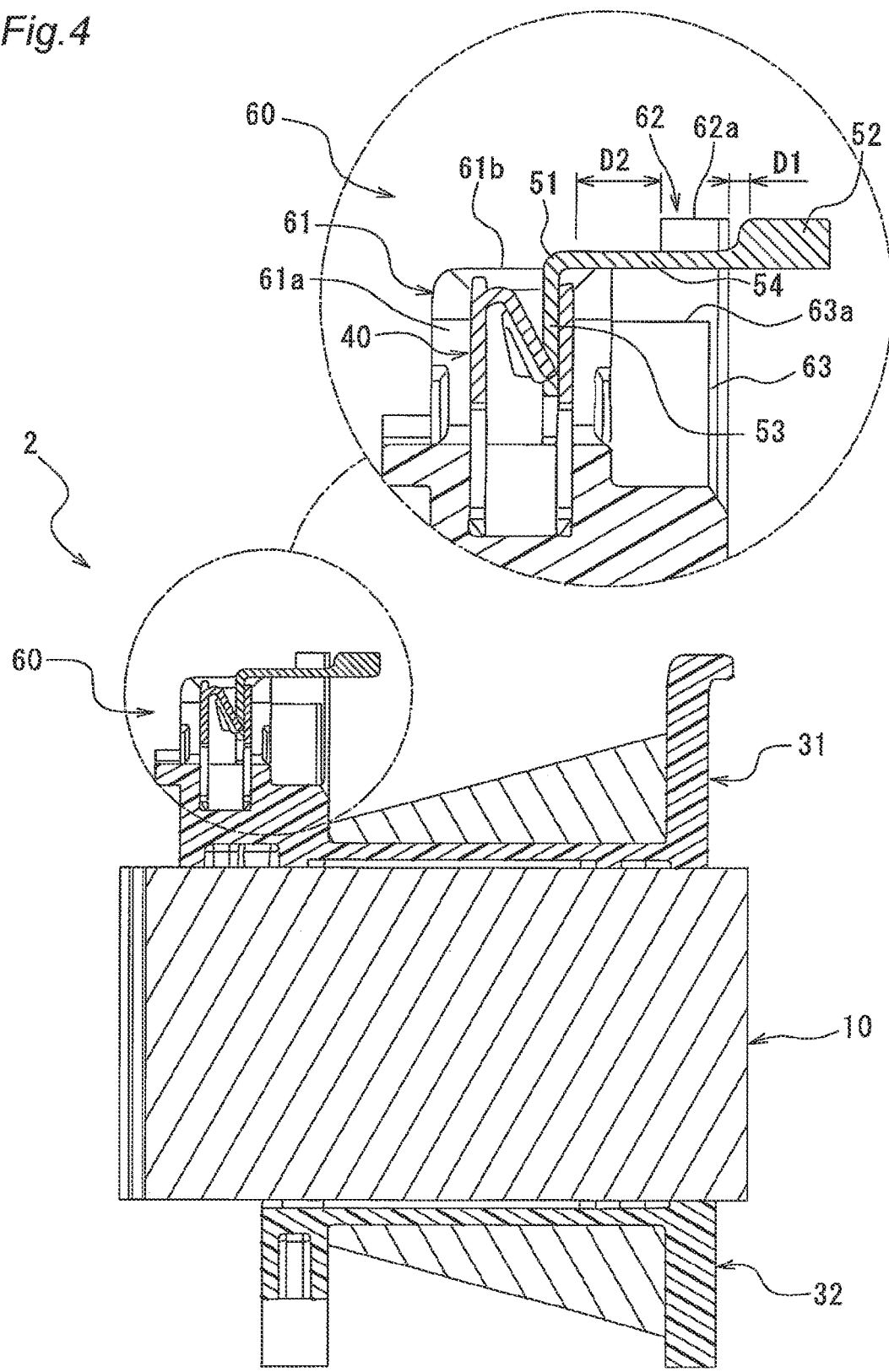
FIG. 4 is a cross-sectional view taken along a line IV-IV in FIG. 1.

FIG. 4 is a cross-sectional view taken along a line IV-IV in FIG. 1.

With reference to FIG. 4, the first restricting portions 62 according to the present embodiment are provided closer to the wire connecting portion 52 than to the bent portion 51 in the housing 60. In other words, the first restricting portions 62 according to the present embodiment are provided adjacent to the wire connecting portion 52 relative to the bent portion 51 in the housing 60. Specifically, a distance D1 between the first restricting portions 62 according to the present embodiment and the wire connecting portion 52 is shorter than a distance D2 between the first restricting portions 62 and the bent portion 51.

The restricting surfaces 63a of the second restricting portions 63 are arranged on one side in the axial direction (lower side in FIG. 4) relative to the upper surface 61b of the housing body 61. On the other hand, upper surfaces 62a of the first restricting portions 62 are arranged on the other side in the axial direction (upper side in FIG. 4) relative to the upper surface 61b of the housing body 61.

Method of Manufacturing Stator

Figure 5:
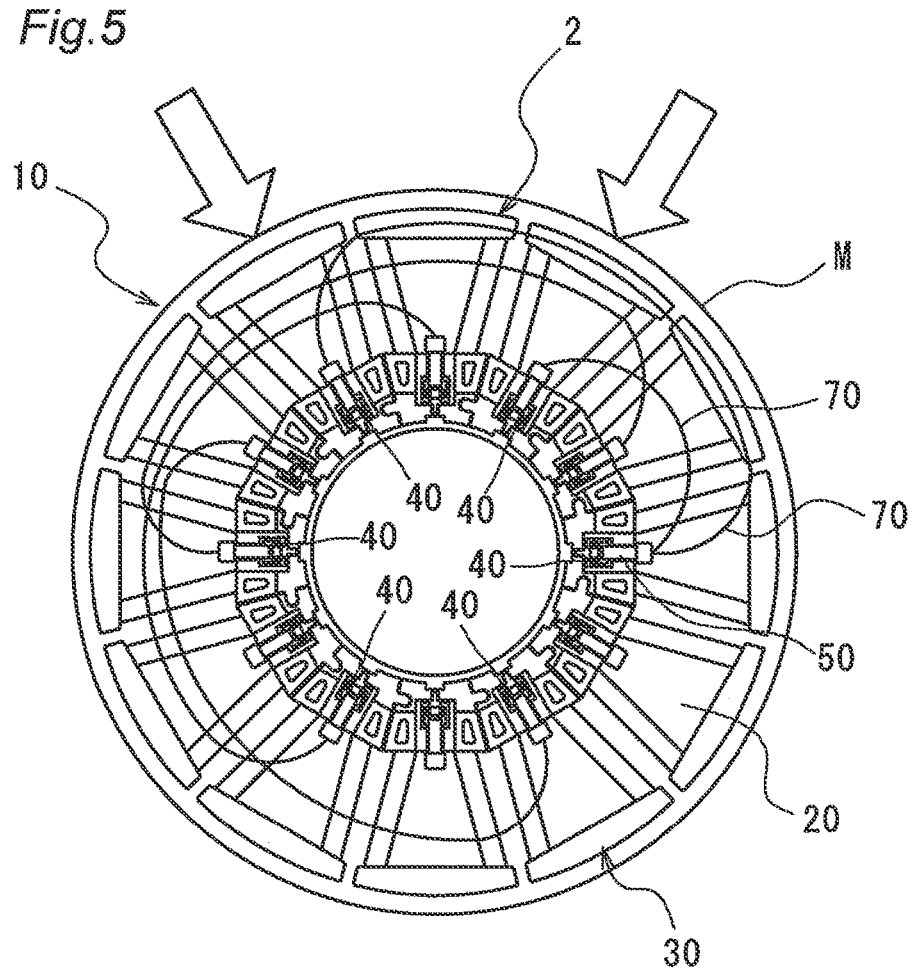
FIG. 5 is a diagram schematically showing a stator according to the first embodiment for describing a method of manufacturing the stator.

A method of manufacturing the stator 2 of the motor 1 according to the present embodiment will be described below with reference to FIG. 5. FIG. 5 is a schematic diagram for describing the method of manufacturing the stator 2 according to the present embodiment, showing the stator 2 as viewed in the axial direction. FIG. 5 shows only some of the plurality of wires 70.

According to the present embodiment, BMC resin is injected into a mold M with components such as the stator core 10 (shown in FIG. 1), the coils 20, and the insulators 30 arranged inside the mold M to form the stator 2. That is, the stator 2 is manufactured by insert-molding components such as the stator core 10, the coils 20, and the insulators 30.

First, each insulator 30 is attached to the stator core 10 (shown in FIG. 1), and each coil 20 is wound around a corresponding one of the teeth 12 of the stator core 10. Next, the first terminal 40 is fitted into the holding hole 61a of the insulator 30. This establishes electrical connection between the first terminal 40 and the lead wire of the coil 20. Thereafter, specifically, the second terminal 50 having the wire 70 connected to the wire connecting portion 52 is fitted into the first terminal 40 to couple to the first terminal 40.

BMC resin is injected into the mold M according to the present embodiment in the radial direction from two places spaced apart from each other in the circumferential direction toward the components of the stator 2 such as the stator core 10, the coils 20, and the insulators 30 (see arrows in FIG. 5). In the present embodiment, the resin flows in the mold M in a direction intersecting the axial direction. Note that the resin injection direction is not limited to the direction intersecting the axial direction (the radial direction in the present embodiment), and may be a direction that coincides with the axial direction, for example.

The motor 1 according to the present embodiment has the following actions and effects.

(1) For example, a force acting on the second terminal 50 due to pressure produced by the resin during insert molding, tension in the wire 70 during wiring work, or the like may cause the second terminal 50 to move relative to the first terminal 40 or deform due to such movement. When the second terminal 50 moves and/or deforms relative to the first terminal 40, a contact area between the first terminal 40 and the second terminal 50 decreases, which may cause an increase in contact resistance between the first terminal 40 and the second terminal 50. On the other hand, in the motor 1 according to the present embodiment, the first restricting portions 62 restrict the movement, in the circumferential direction, of the portion of the second terminal 50 other than the electrical connecting portion 53 inserted into the first terminal 40, so that it is possible to prevent the second terminal 50 from unintentionally moving relative to the first terminal 40 and/or deforming when a force in the circumferential direction acts on the second terminal 50. This makes it possible to suppress an increase in contact resistance between the first terminal 40 and the second terminal 50. For example, when the resin during insert molding flows in a direction intersecting the axial direction as in the present embodiment, resin flowing in the circumferential direction causes a force in the circumferential direction to act on the second terminal 50. The technology according to the present disclosure is effective in such a case.

(2) In the motor 1 according to the present embodiment, the first restricting portions 62 restrict the movement, toward one side in the axial direction, of the portion of the second terminal 50 other than the electrical connecting portion 53 inserted into the first terminal 40, so that it is possible to prevent the second terminal 50 from unintentionally moving relative to the first terminal 40 or deforming due to such movement when a force toward one side in the axial direction acts on the second terminal 50. This makes it possible to suppress an increase in contact resistance between the first terminal 40 and the second terminal 50. For example, when the resin injection direction during insert molding is a direction toward one side in the axial direction (downward in FIG. 3), the resin flows, in the mold, toward one side in the axial direction. At this time, the resin flows toward one side in the axial direction causes a force toward one side in the axial direction to act on the second terminal 50. The technology according to the present disclosure is effective in such a case.

(3) In the present embodiment, the electrical connecting portion 53 of the second terminal 50 is inserted and fitted into the first terminal 40. Therefore, when a force in the circumferential direction acts on the wire connecting portion 52 of the second terminal 50, the portion of the second terminal 50 on the side of the wire connecting portion 52 relative to the bent portion 51 tries to move with the bent portion 51 as a base point. The first restricting portions 62 are provided closer to the wire connecting portion 52 than to the bent portion 51 in the housing 60, so that it is possible to prevent the wire connecting portion 52 from moving or deforming due to such movement as compared with a case where the first restricting portions 62 are provided closer to the bent portion 51 than to the wire connecting portion 52 in the housing 60.

In the first embodiment, the motor of an outer rotor type has been described, but the technology according to the present disclosure may be applied to a motor of an inner rotor type, for example.

Second Embodiment

Figure 6:
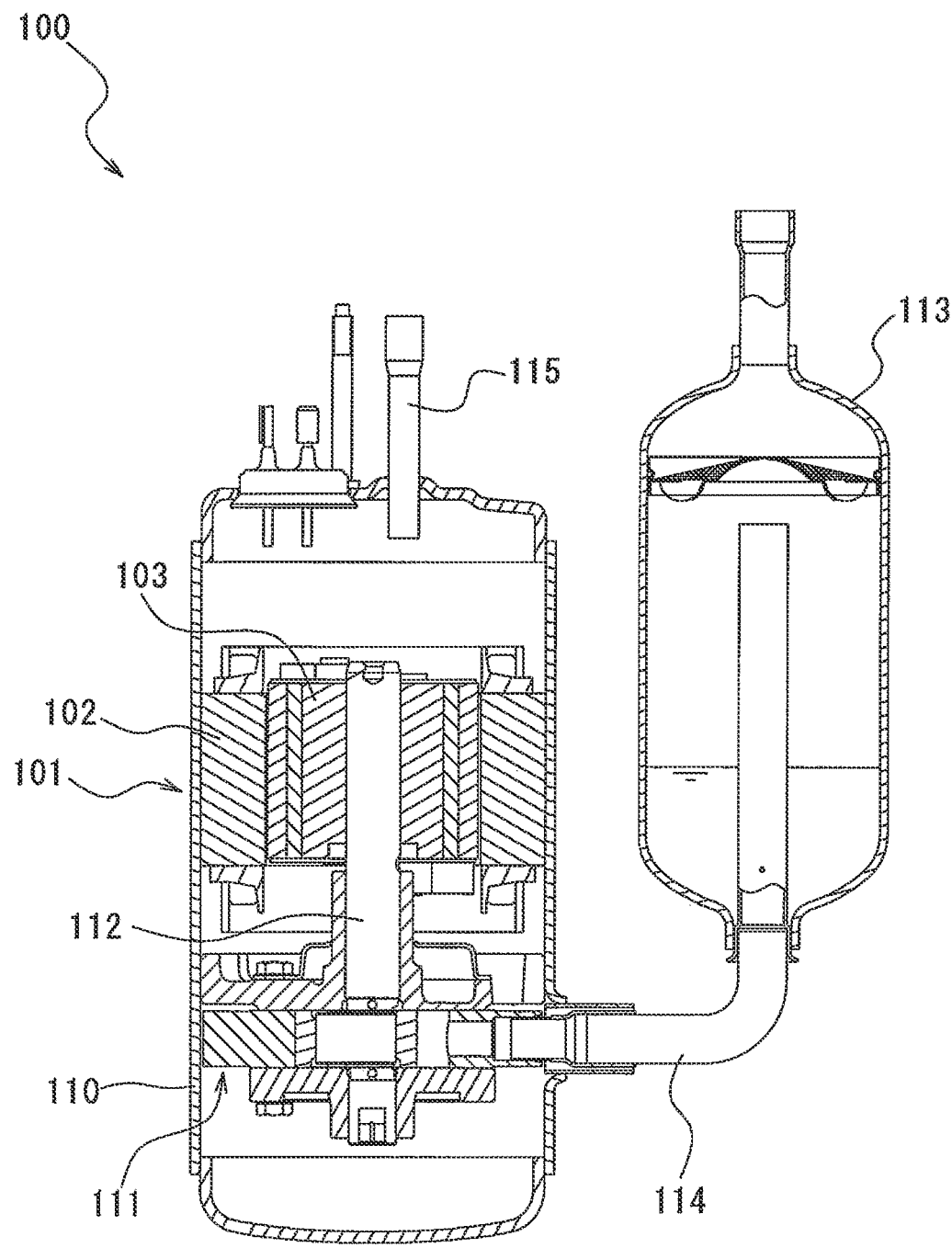
FIG. 6 is a longitudinal cross-sectional view of a compressor that is an example to which a motor according to a second embodiment is applied.

FIG. 6 is a longitudinal cross-sectional view of a compressor 100 including a motor 101 according to a second embodiment. The motor 101 according to the present embodiment is different from the motor 1 according to the first embodiment in that the motor 101 is of an inner rotor type. On the other hand, the motor 101 according to the present embodiment is similar to the motor 1 according to the first embodiment in that the technology according to the present disclosure is applied. That is, the motor 101 according to the present embodiment is also structured to suppress an increase in contact resistance between terminals as described in the first embodiment.

The motor 101 according to the present embodiment includes a stator 102 having an annular shape and a rotor 103 surrounded by the stator 102.

With reference to FIG. 6, the compressor 100 according to the present embodiment includes a hermetic container 110, a compression mechanism 111 disposed in the hermetic container 110, and the motor 101 disposed in the hermetic container 110 and configured to drive the compression mechanism 111 via a shaft 112. This compressor 100 can be used, for example, in an air conditioner.

The compressor 100 is a so-called vertical high-pressure dome-type rotary compressor, and has the compression mechanism 111 disposed on a lower side of the hermetic container 110 and the motor 101 disposed above the compression mechanism 111. The compression mechanism 111 is driven by the rotor 103 of the motor 101 via the shaft 112. The motor 101 in the present application example is of an inner rotor type, and the technology according to the present disclosure is applied to the motor 101.

When the compressor 100 is used in an air conditioner, the compression mechanism 111 sucks refrigerant gas from an accumulator 113 through a suction pipe 114. Controlling a condenser, an expansion mechanism, and an evaporator (not shown) that constitute the air conditioner that is an example of a refrigeration system together with the compressor 100 generates the refrigerant gas.

Further, the compressor 100 discharges the compressed high-temperature and high-pressure refrigerant gas from the compression mechanism 111 to fill the inside of the hermetic container 110. This refrigerant gas passes through a gap between the rotor 103 and the stator 102 of the motor 101, and is discharged outside from a discharge pipe 115 provided above the motor 101.

The second embodiment produces actions and effects the same as the actions and effects of the first embodiment.

Third Embodiment

Figure 7:
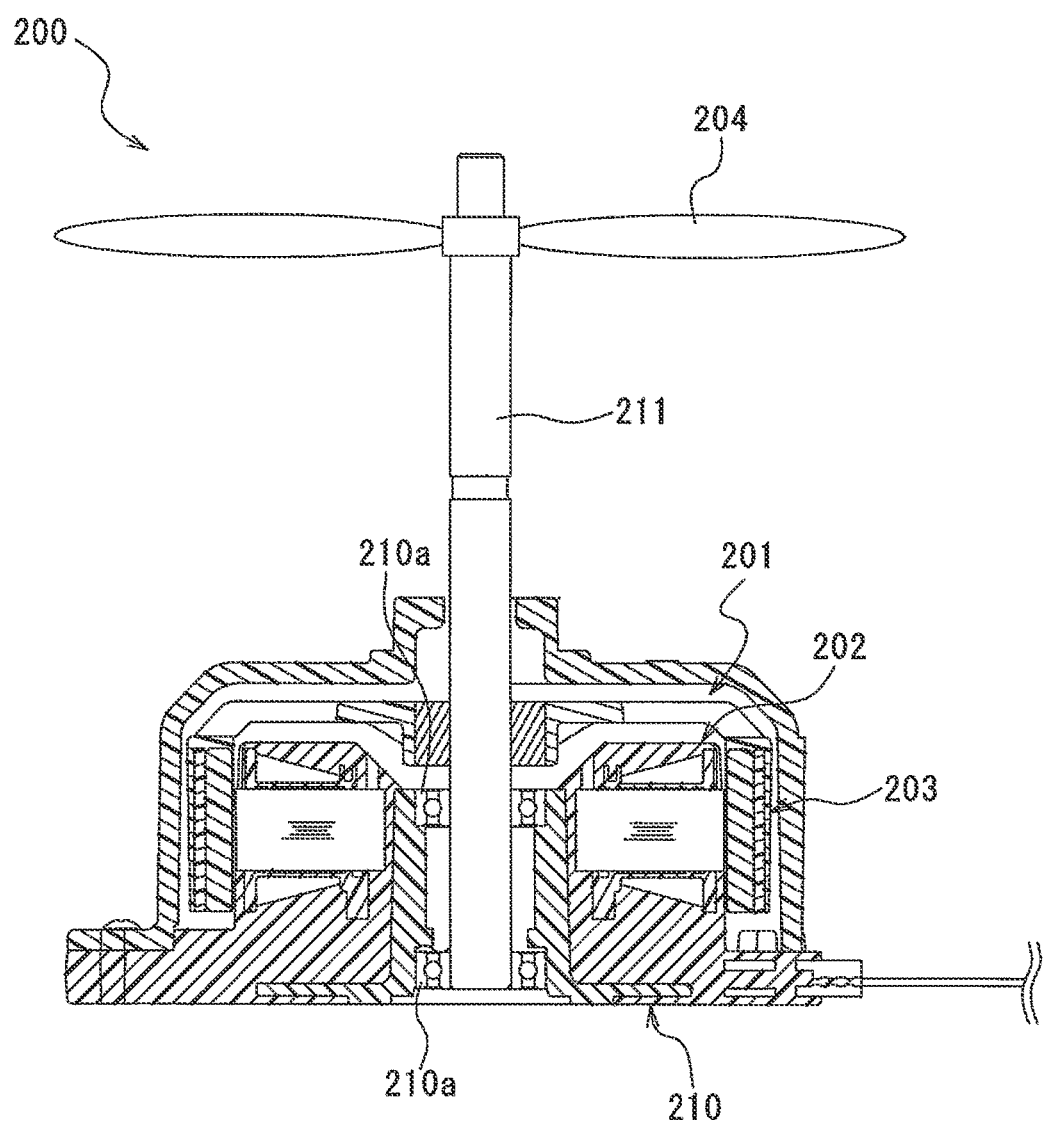
FIG. 7 is a longitudinal cross-sectional view of a fan motor that is another example to which a motor according to a third embodiment is applied.

FIG. 7 is a longitudinal cross-sectional view of a fan motor 200 including a motor 201 according to a third embodiment.

The motor 201 according to the present embodiment is of an outer rotor type. That is, the motor 201 according to the present embodiment includes a stator 202 having an annular shape, and a rotor 203 having an annular shape and disposed so as to surround the stator 202. The stator 202 according to the present embodiment is the same in structure as the stator 2 according to the first embodiment, so that no detailed description of the stator 202 will be given below. Likewise, the rotor 203 is the same in structure as the rotor 3 according to the first embodiment, so that no detailed description will be given below.

The stator 202 of the motor 201 according to the present embodiment is covered with a resin molded portion 210. The resin molded portion 210 is formed of BMC resin that is a thermosetting resin material.

The fan motor 200 according to the present embodiment further includes a fan 204 driven by the motor 201.

The fan 204 according to the present embodiment is an axial fan. FIG. 7 schematically shows the fan 204, and a size of the fan 204 thus shown may be different from an actual size.

The fan 204 is coupled to a shaft 211. The shaft 211 is supported rotatable relative to the resin molded portion 210 by a bearing 210a fixed to the resin molded portion 210. The shaft 211 is fixed to the rotor 203.

The third embodiment produces actions and effects the same as the actions and effects of the first embodiment.

Although the embodiments have been described above, it will be understood that various changes in form and details can be made without departing from the spirit and scope of the claims.

For example, in the first to third embodiments, the housing 60 is provided integrally with the first insulator 31 of the insulator 30, but is not limited to such a structure, and the housing 60 may be provided separately from the insulator 30, for example.

In the first to third embodiments, the first restricting portions 62 are protrusions, but are not limited to such a structure, and the shape, position, and size of the first restricting portions 62 may be changed, as needed, to adapt to the shape of the second terminal or the like, for example.

In the first to third embodiments, the stator core 10 is divided into the plurality of stator core pieces 10P, but is not limited to such a structure, and the stator core 10 may be made of a single member, for example. The stator 2 includes the plurality of stator units 2U, but is not limited to such a structure.

The motor according to the present disclosure is applicable to not only a compressor and a fan motor, but also a device using another motor, for example.

The invention claimed is:

1. A motor comprising:
a stator core having an annular shape;
a coil wound around a tooth of the stator core;
a first terminal electrically connected to the coil;
a housing that houses the first terminal; and
a second terminal at least partially inserted into the first terminal housed in the housing,
the second terminal including an electrical connecting portion inserted into the first terminal and electrically connected to the first terminal, and
the housing including a first restricting portion that is adjacent to a portion of the second terminal that is not inserted into the first terminal and the first restricting portion restricts movement, in a circumferential direction of the stator core, of the portion of the second terminal.

2. The motor according to claim 1, wherein
the housing includes a housing body that houses the first terminal, and
the first restricting portion is a protrusion protruding from the housing body.

3. The motor according to claim 1, wherein
the housing includes a second restricting portion that restricts movement, toward at least one side in an axial direction of the stator core, of the portion of the second terminal other than the electrical connecting portion.

4. The motor according to claim 1, wherein
the second terminal is bent at a bent portion,
the second terminal includes a wire connecting portion provided on an opposite side of the bent portion from the electrical connecting portion, and
the first restricting portion is provided closer to the wire connecting portion than to the bent portion in the housing.

5. The motor according to claim 1, further comprising:
an insulator attached to the stator core,
the housing being provided integrally with the insulator.

6. A compressor including the motor according to claim 1, the compressor further comprising:
a compression mechanism configured to be driven by the motor.

7. A fan motor including the motor according to claim 1, the fan motor further comprising:
a fan configured to be driven by the motor.

* * * * *